Jan. 2, 1962 — M. O. NELSON — 3,015,518
REAR WINDOW CLEANER
Filed Aug. 5, 1959
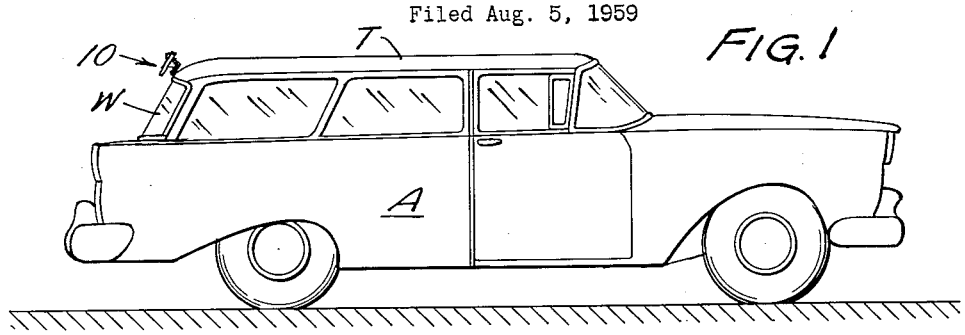
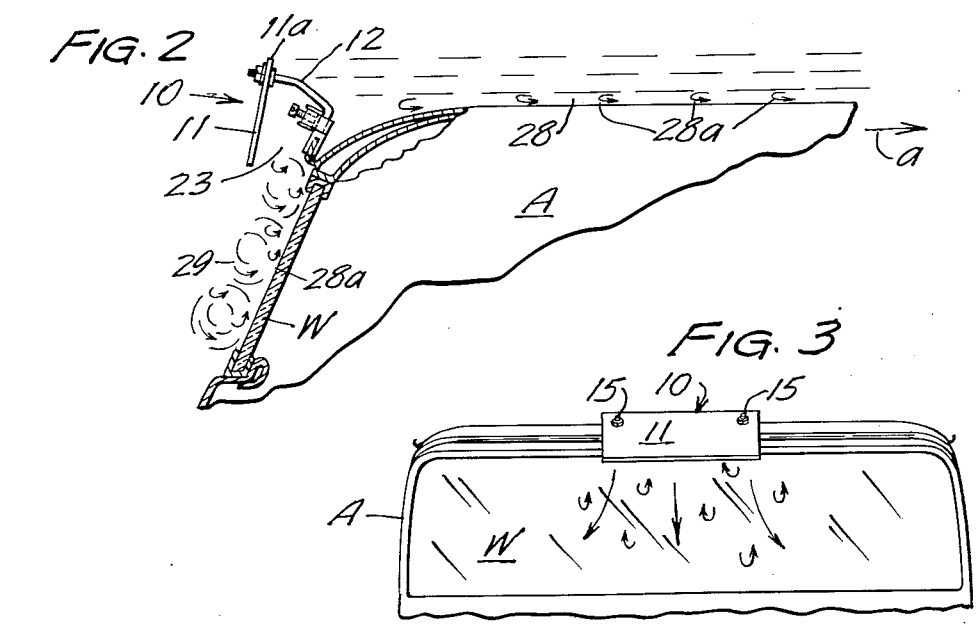
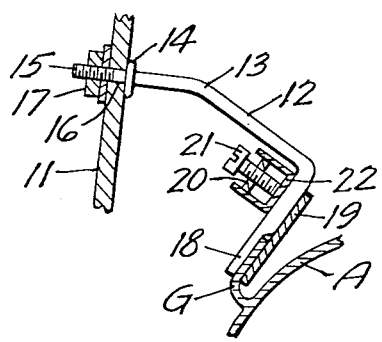
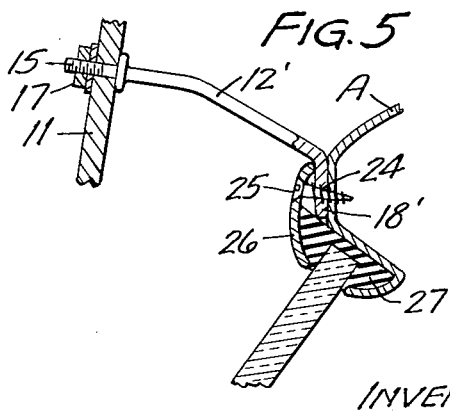
INVENTOR
MARVIN O. NELSON
BY Williamson, Schroeder & Palmatier
ATTORNEYS

United States Patent Office 3,015,518
Patented Jan. 2, 1962

3,015,518
REAR WINDOW CLEANER
Marvin O. Nelson, Starbuck, Minn.
Filed Aug. 5, 1959, Ser. No. 831,762
1 Claim. (Cl. 296—91)

This invention relates to automobile accessories, and more specifically relates to attachments for cleaning and maintaining the rear window of automobiles and particularly station wagons, free from accumulations of dust and snow.

It has been found by persons such as rural route delivery men, who must daily travel dusty roads under all types of weather conditions, that the rear window of the automobile and particularly a station wagon, will have an accumulation of dust and snow collected thereon. Apparently there is a partial vacuum produced adjacent the outside surface of the rear window and as a result dust and snow will collect in this area and will collect on the rear window surface.

An object of my invention is to provide a new and improved automobile rear window cleaner of simple and inexpensive construction and operation.

Another object of my invention is to provide an automobile rear window cleaning device of extremely simple design which is efficient in its operation and unobtrusive in its appearance, and may when used on commercial vehicles, provide the additional function of carrying suitable legend or indicia to be a sign.

A further object of my invention is to provide a novel automobile rear window cleaning device which operates continuously whenever the automobile is in motion and which does not in any way interfere with the normal operation of the automobile.

These and other objects and advantages of my invention will more fully appear from the following description made in connection with the accompanying drawings wherein like reference characters refer to the same or similar parts throughout the several views and in which:

FIG. 1 is an elevation view of an automobile and more particularly a station wagon to which the present invention is applied;

FIG. 2 is a detail section taken on a vertical plane at 2—2 in FIG. 3 through the rear section of the automobile body and through the rear window cleaning device which is attached thereto;

FIG. 3 is a detail rear elevation of the body with the present invention applied thereto;

FIG. 4 is an enlarged section showing the mounting bracket and

FIG. 5 is an enlarged section showing a modified form of mounting bracket.

One form of the present invention is shown in the drawings and is described herein. In FIG. 1 is shown an automobile A which is of typical modern design wherein the body portion has a substantially flat top T and a rear window W oriented in a generally upright, and in the form shown, forwardly inclined position below the rear end of the flat top T. The rear window cleaning device is indicated in general by the numeral 10.

The rear window cleaning device 10 comprises a substantially flat and rigid imperforate plate element 11 and mounting brackets 12 projecting forwardly from the plate 10 which is normally oriented transversely of the automobile at a position adjacent the upper edge of the rear window and in spaced relation with the adjacent body portions of the vehicle. It will be seen that the mounting brackets 12 are constructed so as to position and hold the plate 11 in a generally upright but forwardly and upwardly inclined position so that the upper edge 11a of the plate is disposed at a position above the flat top T of the automobile body.

The mounting brackets 12 are shown in detail in FIG. 4. Each mounting bracket includes an elongated rod 13 having a rigid collar 14 formed integrally thereof and a threaded rear end 15 which projects through an aperture 16 in the plate 11 and is secured in the aperture by a nut 17. The apertures 16 are disposed closer to one edge of the plate than to the other edge of the plate in order to facilitate orientation of the plate 11 on the brackets 12, or to permit swinging of the brackets with respect to the plate, so that the upper edge of the plate 11 projects slightly above the automobile top T when mounted. The forward end 18 of the rod 13 is angulated downwardly to lie along the outer side of the rain gutter G which is formed integrally with the body of the automobile A and to cooperate with the movable jaw element 19 in clamping on the gutter G. The movable jaw 19 has a sleeve portion 20 formed integrally therewith in encompassing relation with the end portion 18 of the rod. The sleeve 20 carries a movable screw 21 and a movable clamping plate 22 urged by means of the screw against the end portion 18 of the rod so as to draw jaw 19 toward the end portion of the rod and into tight clamping engagement with the gutter G.

It will be seen in FIG. 3 that the mounting brackets 12 are disposed in spaced relation with each other so as to define, between the plate 11 and the automobile body, an open area 23 through which a substantial quantity of air may easily flow.

In FIG. 5 an alternative form of mounting bracket 12' is shown which is secured to the plate 11 in a manner previously described and has an inner end portion 18' with an aperture 24 therein to receive the conventional screw 25 therethrough which holds the trim 26 in shielding relation with the window-retaining rubber gasket 27 adjacent the body of the automobile A.

In the operation, it will be recognized that when the automobile A is moving at a high velocity in the direction of arrow a, a thin layer 28 of highly turbulent and high energy air moving in minute vortices 28a lies along the top T of the automobile. This layer, commonly known as the shear layer, is produced because the automobile body is moving at a high velocity and the adjacent air is essentially stationary. The air at the inner side of the layer 28 moves with a velocity approximating the velocity of the automobile and the air at the outer side of the layer is stationary and therefore this condition of high turbulence is produced. The air moving in these minute vortices 28a are deflected downwardly by the plate 11 along with additional air which also engages the plate 11 and a turbulence is imparted to this additional air as indicated in FIG. 2 by the arrow 29. It appears that the minute vortices 28a move in larger vortices as they pass downwardly and over the outside surface of the window W so as to give the window a vigorous scouring and sweeping action and thereby remove any accumulation of dust or snow from the window. As the air moves downwardly from the plate 11, it will be seen in FIG. 3 that the air flows outwardly toward the transverse edges of the window as well as in the downward direction so that substantially all portions of the rear window are cleaned and maintained free of an accumulation of dust or snow.

It will, of course, be understood that various changes may be made in the form, detail, arrangement and proportion of the parts without departing from the scope of my invention which consists of the matter described herein and set forth in the appended claim.

What I claim is:

An automobile rear window cleaner comprising an elongate rigid air-deflecting plate to be oriented transversely of the automobile and along the top of the rear window and to extend in a forwardly and upwardly inclined direction with the upper edge of the plate extending above the top of the automobile body and in the air stream to direct air downwardly and turbulently across the rear window for scouring and sweeping dust and snow from the window, a pair of brackets respectively disposed adjacent opposite ends of the plate to extend between the plate and the automobile body, each of said brackets having a forward end with a downwardly and rearwardly extending bifurcated mounting portion defining a slot-like opening having an open lower end to receive an appendage of the automobile body therein for holding said plate in said predetermined position with respect to the rear window, said brackets also having rearwardly extending projections, said plate having a pair of projection-receiving apertures spaced from the upper and lower edges of the plate, said apertures being disposed closer to one of said edges than to the other of said edges, whereby to permit said plate to be mounted on said projections for adjustment relative thereto between adjusted positions in order to mount the plate with the upper edge thereof above the top of the automobile body, said plate being mounted on said projections when in one position with said one edge thereof disposed uppermost and being removable from said projections for turning of the plate to permit mounting thereof on the projections and in adjusted position with said one edge being disposed lowermost and means on said projections for retaining the plate thereon in the respective positions.

References Cited in the file of this patent

UNITED STATES PATENTS

| | | |
|---|---|---|
| D. 171,320 | Berry | Jan. 26, 1954 |
| 868,279 | Little | Oct. 15, 1907 |
| 1,543,877 | Saunders | June 30, 1925 |
| 2,199,883 | Ishiwata | May 7, 1940 |
| 2,334,856 | Atkinson | Nov. 23, 1943 |
| 2,628,124 | Dieterich | Feb. 10, 1953 |
| 2,919,952 | Riddle et al. | Jan. 5, 1960 |
| 2,933,344 | Shumaker | Apr. 19, 1960 |